March 5, 1935.     L. H. MIDDLETON     1,993,070
AUTOMOBILE CONTROL SYSTEM
Filed Aug. 22, 1932     4 Sheets-Sheet 1
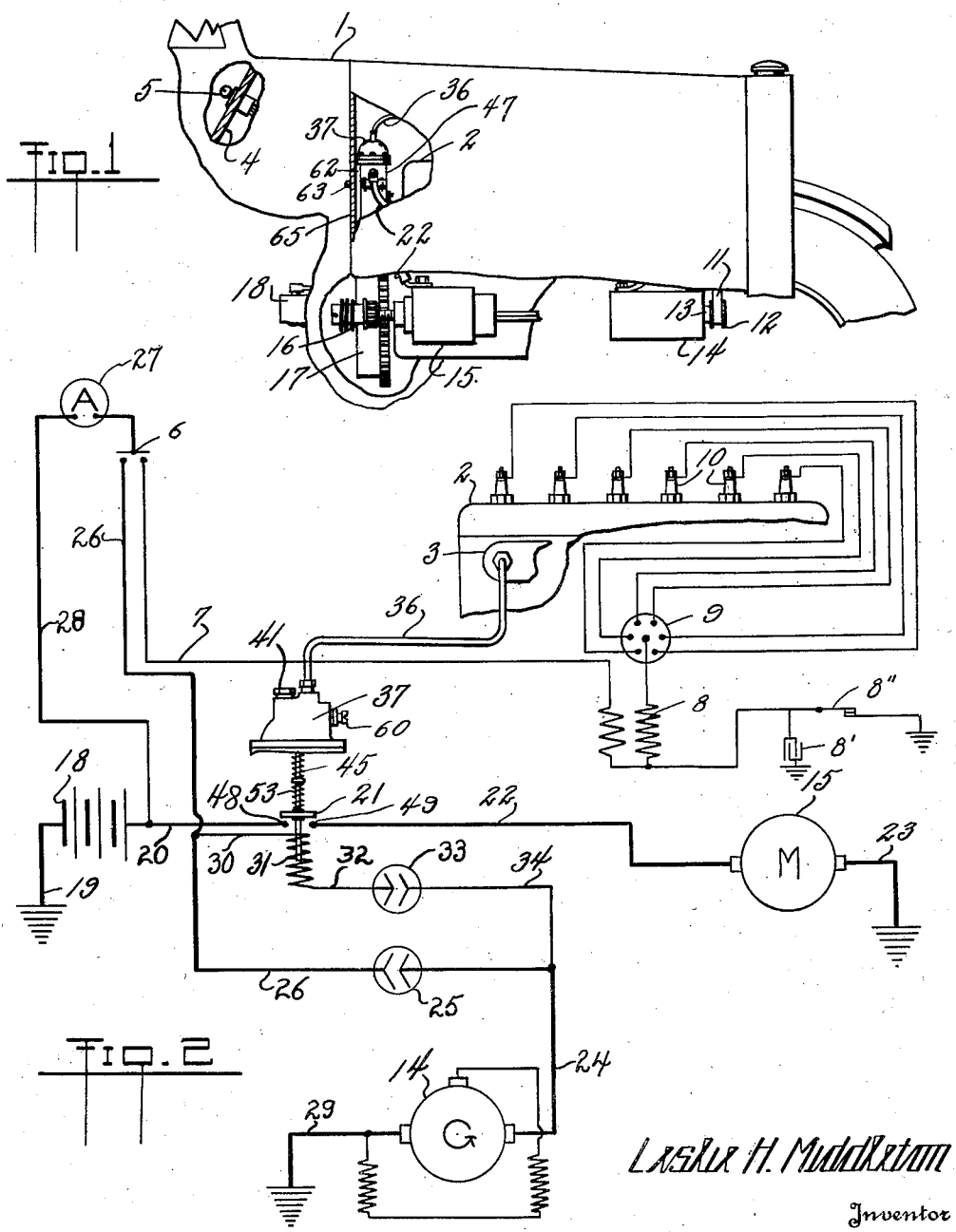
Leslie H. Middleton
Inventor
By
Attorney

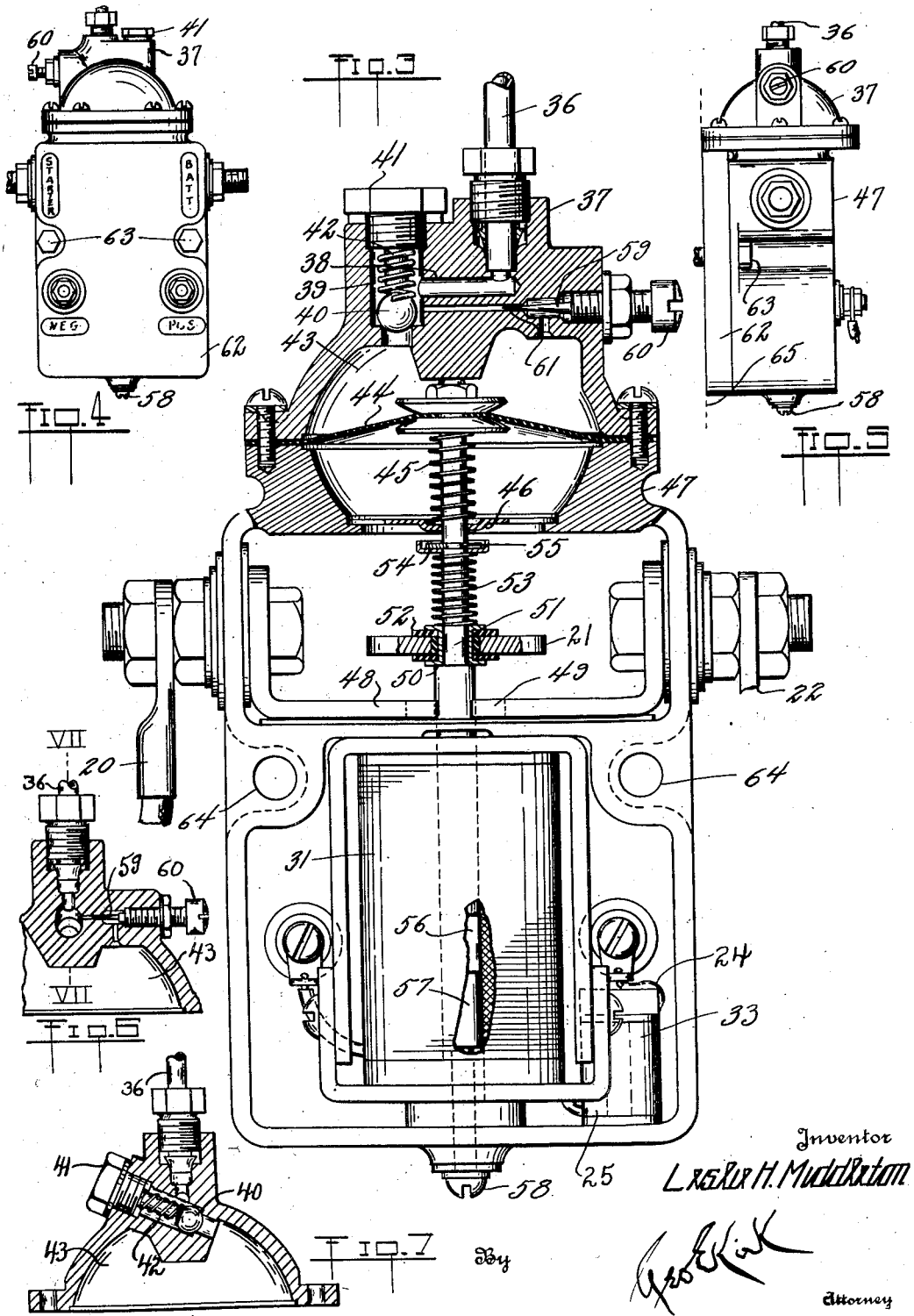

March 5, 1935.  L. H. MIDDLETON  1,993,070
AUTOMOBILE CONTROL SYSTEM
Filed Aug. 22, 1932    4 Sheets-Sheet 3
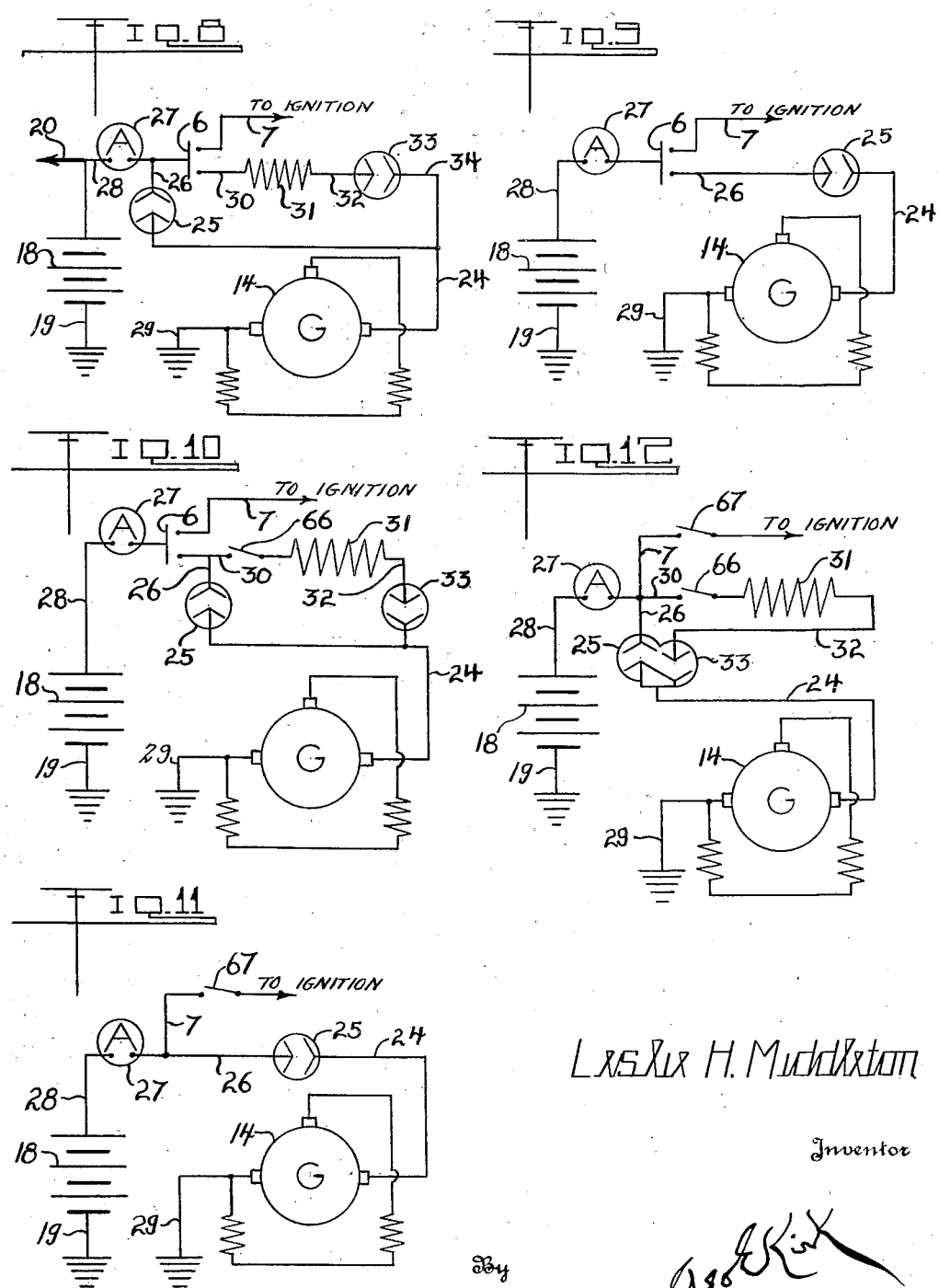
Leslie H. Middleton
Inventor
By
Attorney March 5, 1935. L. H. MIDDLETON 1,993,070
AUTOMOBILE CONTROL SYSTEM
Filed Aug. 22, 1932 4 Sheets-Sheet 4
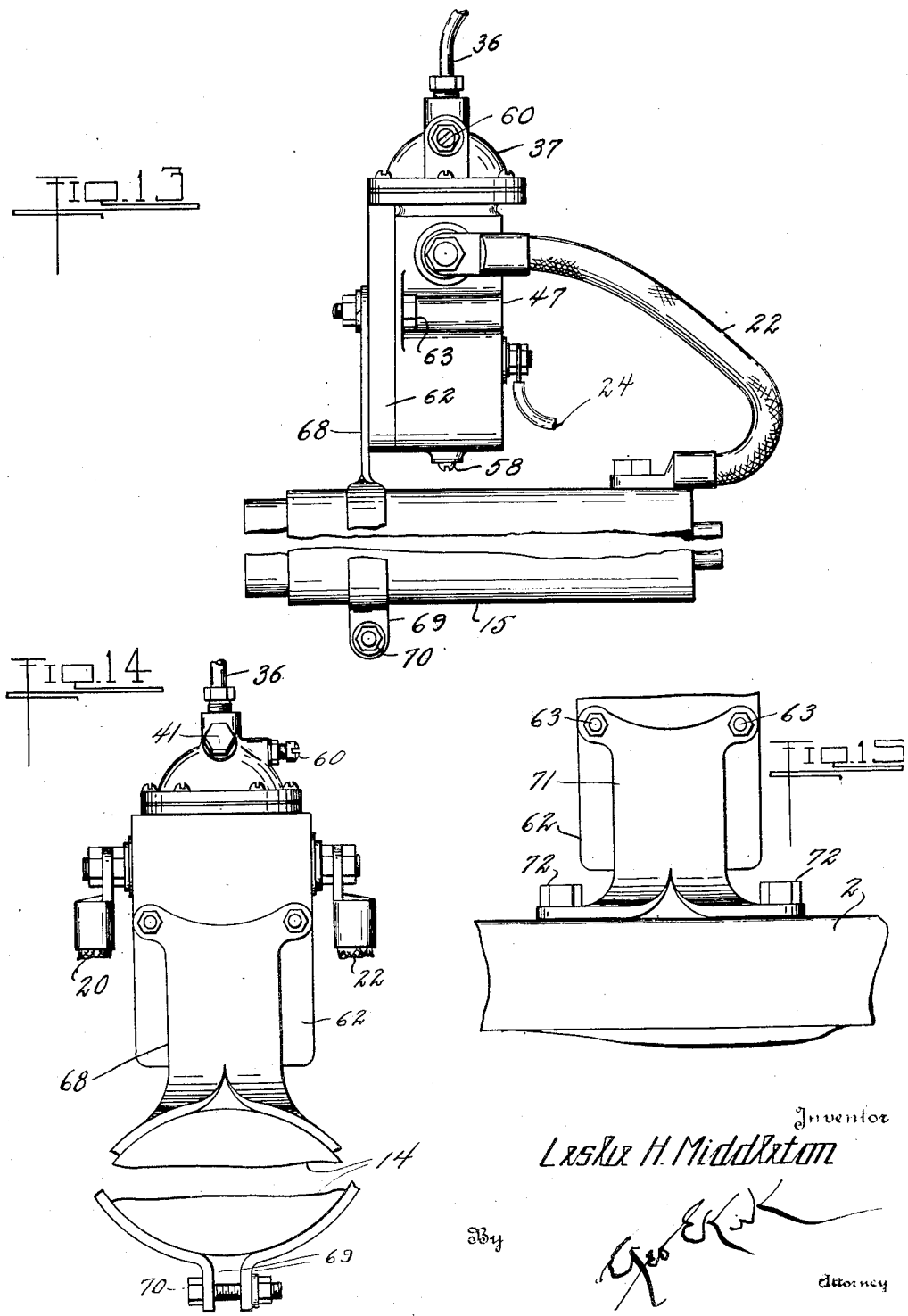

Patented Mar. 5, 1935

1,993,070

UNITED STATES PATENT OFFICE 1,993,070

AUTOMOBILE CONTROL SYSTEM

Leslie H. Middleton, Adrian, Mich., assignor to Schwarze Electric Company, Adrian, Mich., a corporation of Michigan Application August 22, 1932, Serial No. 629,819

1 Claim. (Cl. 290—37)

This invention relates to electric charging, consumption and control features, more particularly in connection with internal combustion engines for motor vehicles.

This invention has utility when incorporated in electric charging of a battery, electrical starting of an engine, together with motor generator equipment therefor, with electrically effective as well as pneumatically effective control features; the specific form of the pneumatic control being in conjunction with the engine intake.

Referring to the drawings:

Fig. 1 is a fragmentary view of a motor vehicle having an embodiment of the invention incorporated therewith;

Fig. 2 is a wiring diagram with fragmentary portions of the pneumatic features incorporated therewith;

Fig. 3 is a view, partially in section, of the unit feature of the device;

Fig. 4 is a front elevation of the unit;

Fig. 5 is a side view of the unit from the left of Fig. 4;

Fig. 6 is a fragmentary section of intake connections to the head or vacuum chamber in the plane of the showing in Fig. 3 for a more compact grouping of the valves and ducts;

Fig. 7 is a section on the line VII—VII, Fig. 6;

Fig. 8 is a wiring diagram omitting the pneumatic feature, with the charging circuit connected on the ammeter side of the manual switch which cuts in the ignition and the starter;

Fig. 9 is a wiring diagram of the charging circuit of Fig. 2 with the absence of the control circuit as well as the pneumatic feature, showing a method of disconnecting the charging circuit from the battery with the ignition switch when the engine is at rest;

Fig. 10 is a wiring diagram showing the control and charging circuit as in Fig. 2 with the omission of the pneumatic control feature and with the addition of a switch in the control circuit in addition to the switch which cuts in the ignition circuit as well as the control circuit, showing a method of disconnecting the starter when the ignition is on and the generator is charging;

Fig. 11 is a wiring diagram showing the charging circuit of Fig. 8, coupled directly to the battery with absence of a switch, and the ignition circuit therefrom as manually controlled with the absence of the pneumatic control and absence of the starting control circuit;

Fig. 12 shows the charging and ignition circuit of Fig. 11, and in addition thereto, the control circuit as manually cut in;

Figs. 13, 14 and 15 are fragmentary views of mountings of the housing for the control unit herein, respectively at the motor, generator and engine.

Motor vehicle 1 is shown provided with multiple cylinder internal combustion engine 2 having intake manifold 3. There is within the vehicle, adjacent the driver's station, dash 4 wherein key 5 may be inserted at switch 6 to cut in ignition circuit 7 past coil 8 with condenser 8' and breaker 8", to distributor 9 for spark plugs 10. The engine 2 is shown having transmission 11 to pulley 12 on shaft 13 for operating generator 14. Motor 15 has starter connection 16 for rotating fly wheel 17 to effect starting operation of the engine 2. The motor vehicle 1 carries energy source or storage battery 18. The storage battery 18 has ground connection 19 at one side.

At the other side, there is an engine-starting power circuit comprising line 20 past switch 21 by line 22 to the motor 15, having ground connection 23. Upon starting the motor 15, the generator 14 may be effective through the charging circuit comprising line 24 through asymmetric cell 25 for power current from the generator 14 by way of the line 24 past the cell 25 and by line 26, the switch 6, ammeter 27, and by line 28 to the battery 18. The generator 14 has ground connection 29 from through its brushes and armature.

A control circuit is provided to cut in the motor 15 for starting the engine 2 and the generator 14. Provision is made for this circuit to operate as a control not only eliminating material load from the control circuit, as the generator runs up to predetermined speed before excitation takes place, but provision is made in this control for precluding restarting until the engine 2 and the starting motor 13 spinning has fully stopped, and a predetermined interval is taken into account to insure such operation.

This control circuit includes, from the battery 18, the line 28 to the switch 6 operable by the key 5. This switch 6, besides cutting in the ignition circuit, may cut in control circuit from the line 28 by way of the line 26, line 30, to coil 31 at the switch 21 to line 32, thence by asymmetric cell 33 in the conducting direction thereof and by line 34 to the line 24 and the generator 14, thence by the line 29 to ground.

This control circuit is effective for closing the switch 21. With the switch 21 closed, the motor 15 is effective to start the engine 2. This starting of the engine 2 causes the generator 14 to rotate and this builds up a resistance against a ready flow of current from the line 34 to the generator 14 to the ground 29.

With this increased resistance, the circuit through the line 34 has a decrease of current flowing therein, due to the varying resistance of the generator 14 as it runs up to a speed which is in direct relationship to that of the engine cranking speed. The asymmetric cell 25 between the line 24 and the line 26 has its blocking direction against any flow of current from the battery 18 through to the generator 14 in any attempt to use this battery current to flow to the generator 14 when it is at rest, or below its excitation speed.

Conversely, when the generator 14 has potential exceeding that of the battery 18, current will flow by the line 24 through the asymmetric cell 25 by the line 26 through the switch 6 by the ammeter 27 through the line 28 to charge the battery 18 and from thence flow to the ground connection 19 in completing the charging circuit with the switch 6 closed.

To start the engine 2, turning of the key 5 closes the switch 6. Then there is a flow of current from the battery 18 by the line 28, the ammeter 27, the switch 6 by the line 26 through the coil 31 by the line 32 through the asymmetric cell 33 in the conducting direction by the lines 34 and 24 to the generator 14 and so to ground by the ground connection 29.

The resistances of the standard type generators used on automobiles today are such that the overall resistance of the generator may be considered when at rest about .33 ohms. With the switch 6 closed, a flow of current energizes the coil 31 and so closes the switch 21 for current to flow from the battery 18 by the line 20, the switch 21, the line 22 through the starting motor 15 and so through ground connection 23.

The engine 2 is now turned over at cranking speed and the internal resistance of the generator may ascend to be in the neighborhood of 1 ohm and so to alter the balance of the current flowing through this control or supervisory circuit. At the same time there is developed in the intake manifold 3 a vacuum which usually in practice never exceeds 8" during this cranking period.

The motor 15 may have its cranking operation discontinued pneumatically. To this end, from the intake 3 of the engine 2, suction duct 36 extends to head 37, thence by passage 38 to chamber 39 above check valve 40. Plug 41 may adjust compression spring 42 and thereby determine the lifting tension effective for unseating the check valve 40, thus allowing the intake 3 to be effective in lowering the pressure in chamber 43. This chamber 43 has flexible diaphragm 44, normally upwardly flexed by spring 45 coacting against stop 46 in housing 47. At the operation of the coil 31 to close the switch 21, this diaphragm 44 is reversely flexed to increase the capacity of the chamber 43.

As the engine 2 gets into firing, it may tend to reduce the pressure in the chamber 43, say to 15". In practice, this may be adjusted to a pressure to lift the switch 21 to the open position. It is thus seen, at once the engine 2 is up to firing speed and even before the generator 14 is excited to produce a current to flow toward the battery 18, that this suction in the chamber 43 may lift the switch 21 to the open position away from the terminals in the housing 47. This upward flexing may be a positive pull away from these terminals because of collar 50 on stem 51.

This switch 21 has insulation bushing 52 on the stem 51.

This bushing is normally acted upon by compression spring 53, yieldably urging the switch 21 toward the shoulder or collar 50. It is thus seen that in the snap operation of the stem 51 toward the terminals 48 and 49, the switch 21 may have a yieldable seating at the terminals 48 and 49, as the collar 50 moves past such terminals. The helical spring 53 is anchored by U-key 54 with reduced portion 55 of the stem 51. This insures the action of the spring 53 relatively to the stem, instead of relatively to the housing 47.

The moving of the stem 51 is into the coil 31 to reduce the air gap 56 which may be adjusted by plug 57 upon which may act screw 58. There is thus possible, a variation of the magnetic flux at the initial position for operating the switch 21. The vacuum is applied to diaphragm 44. The area of the diaphragm 44 is calculated so that a vacuum of cranking subpressure of 8" will not have sufficient power to break the magnetic connection of the plunger against the stop 57 in the coil 31. And so the engine continues to crank.

As the engine 2 comes to speed, the suction in the chamber 43 may now develop a vacuum as low as 15". There is accordingly assured a holding of this switch 21 at the open upper position. This precludes operating the engine 2 by any throwing in of the switch 21 to operate the motor 14 to thereby result disastrously to the starter connection mechanism 16. This is true notwithstanding the switch 6 may be maintained closed.

Should the generator 14 become ineffective through slowing down of the engine 2 or through some irregularity in operation, there may be a re-energizing of the control circuit. However, then this pneumatic device keeps the switch 21 open, not only during the operation of the engine 2, say even for idling, but for a period which may be adjusted to insure against any objectionable occurrence as to the starter connection 16. This control is effective at the chamber 43.

When the engine 2 stops, the valve 40 would not tend to be unseated at once. This is because there is a tendency for this chamber 43 to hold the vacuum and the interval of such holding may be adjusted even independently of the coming of the intake manifold 3 to atmospheric pressure, or in a desired timing of the coming of the intake manifold to atmospheric pressure. This end, as herein disclosed, is obtained by adjustment of needle valve 59 by screw 60, thereby controlling clearance in by-pass passage 61 between the chamber 43 and the chamber 39 by-passing the valve 40. In practice, this adjustment has been up even to fifteen minutes interval.

It is desirable that this pick-up may be adjusted during operation according to the performance of the engine 2, so that there may be the insured interval that the engine 2 has come to rest. Therefore, the leakage into the chamber 43 is such that, with the generator 14 stopped, the ground through such generator from the line 24 may be then effective for current from the battery 18 to energize the coil 31 sufficiently to close the switch 21. There is thus controlled timely restarter operation of the engine 2 at once the engine is really dead. This makes available a nicety of control in a simplified compact construction wherein the housing 47 may be fixed with closure plate 62 and mounted by bolts 63 passing through openings 64 in the housing 47 to anchor this unit fitting say on partition 65 between the engine 2 and the interior of the motor vehicle.

In the operation hereunder, the vehicle driver may insert key 5 and operate such to throw the switch 6. This not only cuts in the ignition circuit but simultaneously cuts in the control circuit for causing the starting motor 15 to be connected to and turn over the engine 2 for cranking. This turning over of the engine 2 at starting likewise turns over the generator 14 and builds up some resistance in the control circuit to ground through such generator. However, at this time with the engine 2 firing, say before the engine is up to speed, the intake 3 has sufficient pull to open the switch 21 and thus to be effective to cut out the starting motor 15 at once the firing operation begins, even though the generator, through some fault, does not run up to the speed of the engine. This operation decreases the current in the coil 31 to such an extent as to de-energize it and allow the spring 45 to open the switch 21. This is a provision for opening the control circuit which may be effective before the generator 14 is at excitation speed.

In addition to this sequence of control timing, there may be, under the adjustable control herein, holding of the switch 21 open, due to the pneumatic means from the intake, until the engine 2 is really dead.

It is the experience of the applicant that, with this coil 31 adopted herein, it is important there be a safeguard at all times against any flow of current from the generator toward the battery or any flow which might tend to operate the switch 21 when the engine 2 is effective.

This untoward condition, were the asymmetric cell 33 not present, might arise from a defective terminal at the battery 18, a disturbed condition between the resistance in the control circuit and the charging circuit, or even an idling condition for the engine 2 or other condition which might not be a generating condition, for there would be then a tendency for throwing of the switch 21.

That these situations may develop may be more plain when a set of conditions as current in practice are considered. For instance, the charging circuit from the generator 14 to the battery 18 may be, say 8' 0" of #18 American Wire Gauge copper wire having a total resistance of .0504 ohms. This does not include, say the ammeter 27, on the dash of, say .001 ohms, nor the asymmetric cell 25, having a resistance of, say .0125 ohms. In the control circuit the lines therein, 28, 26, 30, 32, may be, say 5' 6" of #14 American Wire Gauge copper wire of resistance say .0137 ohms. The coil 31 may be of #18 American Wire Gauge copper wire of resistance .47 ohms. The winding of the generator, say of Delco or Autolite type, has a standard resistance overall when at rest of approximately .33 ohms.

It is important to note at this point, that on the average automobile at idling speed for the engine, the generator is not up to excitation speed but that its resistance increases to in the neighborhood of 10 to 15 ohms at engine idling speed and that this increase in the resistance of one unit in the series control circuit is sufficient to diminish the flow of current through the coil 31 and cause de-energizing of it to such an extent as to cause the switch 21 to be opened by the upward pressure of the spring 45, even without the aid of the pneumatic suction on the diaphragm.

It is apparent therefore, that the voltage output of the generator is in no wise essential to the operation of this control system, but that the generator coming up to a speed whereby its resistance increases to in the neighborhood of 10 ohms is sufficient to cause the de-energizing of the coil 31 to such an extent as to make it ineffective.

After starting has been completed and the generator 14 runs up to excitation speed and generates potential to charge the battery, it charges by the line 24 through the asymmetric cell 25 in the conducting direction. This means the circuit is closed by way of the line 26 through the switch 6, the ammeter 27 and the line 28 to the battery 18 and thence to ground by the ground connection 19. The asymmetric cells 25 and 33 may be of two half wave pattern type mounted back to back (Fig. 12) and separately connected in circuit, one in the circuit to prevent the flow of current from the generator re-exciting the coil 31 and the other in the battery charging circuit to prevent the battery being effective to tend to motor the generator 14 while this generator is at rest.

The adaptations of the asymmetric cell as herein disclosed in connection with the charging and control circuit are variously brought out not only in the wiring diagram in Fig. 2 but in the wiring diagrams of Figs. 8 to 12 inclusive. Opening of the switch 6 (Fig. 8) breaks the ignition and control circuits, but does not directly affect the charging circuit. Opening of the switch 6, (Fig. 9) breaks the ignition and charging circuits. The control circuit may have a special switch 66 therefor in such circuit in addition to the switch 6 (Fig. 10) for cutting out the control circuit with the engine left running. Such switch 66 may be used directly for cutting in of the control circuit (Fig. 12).

Likewise independent or separate from the switch 6 there may be ignition circuit switch 67 as apart from the charging or control circuit (Figs. 11, 12). In these various control circuits, it is to be noted that without the interposition of contacts, there is effective, due to the asymmetric cell combination, a cut-out means in the charging circuit against battery discharge. Likewise in the control circuit, there is cut-out without the intervention of contacts for such purpose of generator charging circuit flow to energize the control circuit solenoid. This means that the motor may not be started by current in the control circuit flowing from the generator. These features are susceptible of compact simplified embodiment in the structure herein with material economies in production, as well as reliability and efficiency in operation.

It is to be noted that the pneumatic device provides a nicety for control in that additionally there may be insured no untoward cutting in of the motor for automatic restarting, coupled here with supplemental niceties as to timing and control. This condition is gauged by the bleeder valve so that the pneumatic device may not release the valve for the starting motor to have the control circuit responsive until such cutting in may obviate disaster to the starting connection. This device works both ways, for it, in its adjustment, does not affect the cutting out until a firing condition has been established which, as herein discussed, may be beyond the cranking and such vacuum or intake pressure drop as comes therefrom, say to the inception of the firing operation which has been found in practice may run from 15″ to 18″ vacuum.

The simple means herein adopted as cooperatively effective with the generator are of exceptional value in conjunction with gas engine installations where the fumes have a tendency to create troubles as to keeping the contacts from becoming coated. Furthermore, mechanically moving parts are always sources of trouble. In the device of the asymmetric cell herein disclosed, in lieu of the cut-out, there is elimination of mechanically moving parts, and there is attained the utility defeating reverse flow in the charging circuit to act upon the generator and cause it to tend to serve as a motor. This electric valve in the asymmetric cell, especially when combined in two half waves oppositely and in the housing, is a simplified adaptation of utility minimizing energy losses through and in the circuits, and there is accordingly, efficiency from the charging circuit consumption standpoint as well as simplification in manufacture and installation and upkeep.

The coil 31, as selected herein, is one which is operative in flow of current which is appreciable. This does not detract from the efficiency of the installation because the energy is used for such a brief period of time. Furthermore, it is a factor in stabilizing the control herein against reverse current strength, leakage or features of such character which might tend to disturb the control conditions. The generator may approach generating conditions. Any such operation away from rest builds up a resistance in the control to such an extent that the coil 31 is de-energized and opens the switch even though the generator may not be up to real charging condition.

These electric valves 25, 33, are accordingly cooperative for nicety of control with latitude for range of operative conditions of the generator as effecting both the charging circuit as for one direction and the control circuit as for the opposite direction.

The unit housing herein is not only compact and involves provision for the two chambers, one pneumatic in its operation and the other including the switch as well as the electrical operator for the switch closing, but additionally, the asymmetric cell for this control circuit as well as for the charging circuit. As herein designed, the device may not be deleteriously affected, even at temperatures as high as 350° F. Accordingly, in caring for the mounting of this housing, in the installation, it may be disposed directly on the starting motor 15 by having the bolts 63 at the housing 47, 62, assemble therewith bracket 68 having spread arm portions terminating in parallel ears 69 to be engaged by clamping bolts 70. In many installations, the motor 15 is of similar dimension to the generator 14 and it is consistent with the installation hereunder, especially as including the cut out eliminating means, for the generator to have this housing mounted upon the generator (Fig. 15) or the motor (Fig. 13).

Should there be questions of clearance or convenience in location, there may be substituted instead of the bracket 68, bracket 71 and a couple of the bolts 72 on the engine 2 may be used for assembling the housing.

It is thus seen that this housing may be assembled with a motive member of the installation whether such be engine, motor, or generator, and as such fixed with an outer fixed portion of such member.

The asymmetric cells are selected as of capacity for efficient operation and may even be up to the normal fusing capacity or operation for the system or installation. That is, the asymmetric cell in the charging circuit may operate efficiently to, say 20 amperes; in the controlling circuit, say up to 6 amperes. The higher capacity cell may be, say of a zinc and silver sulphide.

This application is a continuation in part, insofar as the subject matter is common, with applications: S. N. 603,109, filed April 4, 1932, S. N. 611,095, filed May 13, 1932.

What is claimed and it is desired to secure by Letters Patent is:

For an internal combustion engine installation embodying an engine, an ignition circuit therefor, an energy source, a starting motor and a generator, a circuit from said energy source to said motor including a starting switch, a charging circuit from said generator to said energy source, a control circuit from said energy source to said charging circuit including a switch closing coil and a manually operable switch, the closing of said manually operable switch completing a circuit to said coil from the energy source through the coil and to ground through a portion of the charging circuit, said coil as energized closing said switch to complete the circuit to the starting motor to crank the engine, an intake on said engine having a suction created therein upon engine operation, suction controlled means for opening said starting switch as the suction reaches a predetermined force, said initial operation of said engine simultaneously operating said generator to build up a potential through the starting circuit thereby reversing the current flow through that portion of said circuit which completes the circuit of the starting switch coil to ground to de-energize said coil, asymmetric cell means in said control circuit preventing the reverse current flow back to said coil and confining such toward the energy source, asymmetric cell means in said charging circuit preventing flow of current from said energy source to the generator to operate such as a motor, an ignition switch between said latter asymmetric cell means and the energy source, and means operable upon engine failure to hold said starting switch open for a predetermined time interval even though consequent generator failure again provides a completed circuit to said starting switch coil.

LESLIE H. MIDDLETON.